US005790135A

United States Patent [19]
Hwang et al.

[11] Patent Number: 5,790,135
[45] Date of Patent: Aug. 4, 1998

[54] PROCESS CONTROL IMPLEMENTING AND VISUALIZING METHOD

[75] Inventors: Yeong-Gil Hwang; Soo-Hyun Kim; Jong-Hoon Kim, all of Seoul, Rep. of Korea

[73] Assignee: Electronics Co., Ltd., Suwon, Rep. of Korea

[21] Appl. No.: 755,134

[22] Filed: Nov. 25, 1996

[30] Foreign Application Priority Data

Nov. 24, 1995 [KR] Rep. of Korea ............... 1995-43530

[51] Int. Cl.$^6$ ..................................... G06F 15/16
[52] U.S. Cl. ............. 345/504; 395/200.54; 395/200.38; 395/670
[58] Field of Search .................... 345/501, 502, 345/504; 395/200.53, 200.38, 200.54, 200.62, 200.64, 670, 672, 676

[56] References Cited

U.S. PATENT DOCUMENTS

| | | | |
|---|---|---|---|
| 5,109,486 | 4/1992 | Seymour | 395/200.54 |
| 5,295,244 | 3/1994 | Dev et al. | 345/357 |
| 5,432,932 | 7/1995 | Chen et al. | 345/965 |
| 5,513,321 | 4/1996 | Katori | 395/200.64 |
| 5,535,335 | 7/1996 | Cox et al. | 395/200.51 |
| 5,542,047 | 7/1996 | Armstrong | 395/200.54 |

*Primary Examiner*—Kee M. Tung
*Attorney, Agent, or Firm*—Robert E. Bushnell, Esq.

[57] ABSTRACT

A process control method for a multiprocessing computer system is performed by executing a display process to display an initial state of general processes on a display terminal of the multiprocessing computer system. The general processes are then executed under the control of a control process. The display process transmits a state information inquiring message to the control process. A confirmation message indicating reception of the state information inquiring message is transmitted to the display process by the control process when the control process receives the state information inquiring message. A process state request message is transmitted to the general processes by the control process, so that only the general processes that are operating normally receive the process state request message. An answer message is transmitted to the control process by each of the general processes that are operating normally. The control process determines whether or not the answer message is received by the control process within a predetermined period of time. A corresponding one of the general processes is determined to be in a normal state when the control process receives the answer message from the corresponding general process within the predetermined period of time. The corresponding general process is determined to be in an abnormal state when the control process does not receive the answer message from the corresponding general process within the predetermined period of time. The control process transmits process state information representative of the states of the general processes to the display process. The general processes determined to be in the abnormal state are automatically terminated and then re-executed. A control state according to the state information is then displayed on the display terminal by the display process.

20 Claims, 6 Drawing Sheets

PROCESS CONTROL IMPLEMENTING AND VISUALIZING METHOD

CROSS-REFERENCE TO RELATED APPLICATIONS

This application makes reference to, incorporates the same herein, and claims all benefits accruing under 35 U.S.C. § 119 arising from an application for *Process Control Implementing And Visualizing Method* earlier filed in the Korean Industrial Property Office on 24 Nov., 1995 and there duly assigned Ser. No. 43530/1995.

BACKGROUND OF THE INVENTION

The present invention relates to a multiprocessing computer system, and more particularly, to a process control method for a multiprocessing computer system that provides visual displays representative of states of the various processes.

In a system having a multiprocessing function, several correlated processes are continually being executed. Necessary communication is also performed among these processes. Additionally, there are processes that are executed independently in the system. These processes perform independent communications.

U.S. Pat. No. 5,513,321 issued to Katori proposes a multiprocessing system containing a networking apparatus and a plurality of processors for transferring data through the networking apparatus from one to another of the plurality of processors. In Katori'321, when a receiving-side processor fails during a data transfer operation, the other data transfer operations are not affected by the failure of the receiving-side processor. Accordingly, Katori'321 provides enhanced data communications in a multiprocessing system. While conventional art, such as Katori'321, provides certain advantages, we have observed that it fails to provide a user with the ability to visually observe abnormal conditions that may arise during the execution of general processes in a multiprocessing system.

SUMMARY OF THE INVENTION

Accordingly, it is an object of the present invention to provide a process control implementing and visualizing method for a multiprocessing system.

It is another object to provide a visualizing method to enable a user to view the state of a computer implemented process.

It is still another object to provide a process control method for a multiprocessing computer system in which a process that has been terminated due to errors is automatically re-executed.

To achieve these and other objects, the present invention provides a process control method for a multiprocessing computer system in which a display process is executed to display an initial state of general processes on a display terminal of the multiprocessing computer system. The general processes are then executed under the control of a control process. The display process transmits a state information inquiring message to the control process. A confirmation message indicating reception of the state information inquiring message is transmitted to the display process by the control process when the control process receives the state information inquiring message. A process state request message is transmitted to the general processes by the control process, so that only the general processes that are operating normally receive the process state request message. An answer message is transmitted to the control process by each of the general processes that are operating normally. The control process determines whether or not the answer message is received by the control process within a predetermined period of time. A corresponding one of the general processes is determined to be in a normal state when the control process receives the answer message from the corresponding general process within the predetermined period of time. The corresponding general process is determined to be in an abnormal state when the control process does not receive the answer message from the corresponding general process within the predetermined period of time. The control process transmits process state information representative of the states of the general processes to the display process. The general processes determined to be in the abnormal state are automatically terminated and then re-executed. A control state according to the state information is then displayed on the display terminal by the display process.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
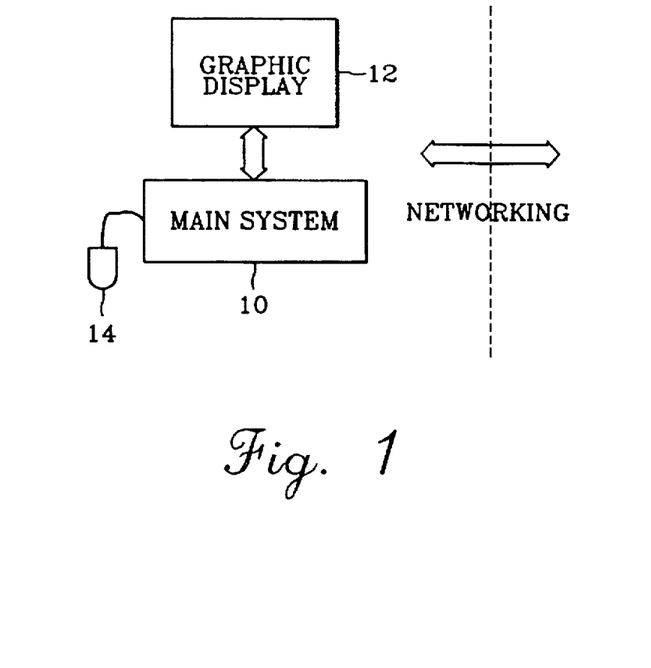
FIG. 1 is a block diagram showing the construction of a computer system enabling multiprocessing according to the principles of the present invention.

Turning now to the drawings and referring to FIG. 1, a block diagram of a computer system enabling multiprocessing according to the principles of the present invention is shown. The computer system of FIG. 1 includes a main system 10, a graphic display 12 and an input device 14, such as a mouse. In the practice of the present invention, main system 10 provides multiprocessing capabilities, and has resources for supporting a network among various systems. Moreover, main system 10 supports a graphics function and an inter-process communication (IPC) function of the system.

For process control according to the present invention, main system 10 is constructed to execute a control process Pm for controlling the state of various processes, general processes P1, P2, P3, . . . Pi for performing various functions, and a display process Pc for displaying the state of the processes. The display process Pc is one of the general processes Pi. Main system 10 includes resources Ri, such as message queues, which the processes share among each other. Graphic display 12 displays the states of the processes under the control of main system 10.

Figure 2:
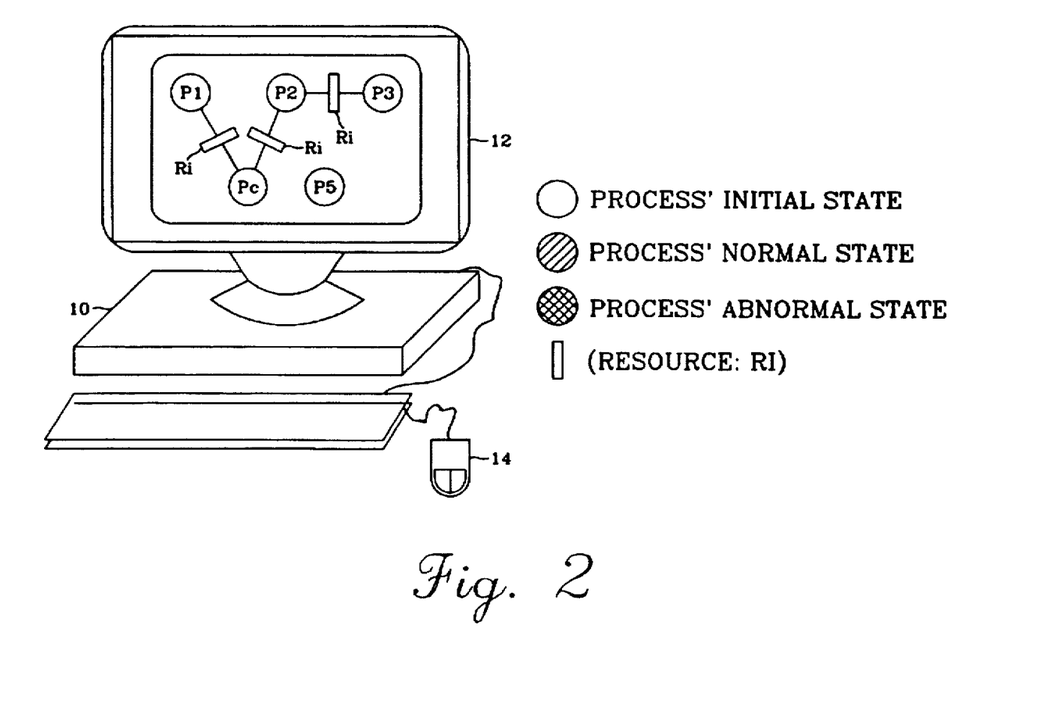
FIG. 2 is a perspective view showing a process control display presented according to the principles of the present invention.

Referring to FIG. 2, a perspective view showing a process control display according to the principles of the present invention is illustrated. FIG. 2 illustrates the general processes P1, P2, P3 and P5 for performing their respective functions and the display process Pc for displaying the state of the processes. The shared resources Ri are connected between the processes. On the right side of FIG. 2, symbols representing the various states of the display process Pc and general processes are shown. The symbol without slanted lines or crossed lines indicates an initial state of a process. The symbol with slanted lines indicates a normal state of a process. The symbol with crossed lines indicates an abnormal state of a process.

The operation of the present invention will now be described in detail with reference to the attached drawings.

Figure 3:
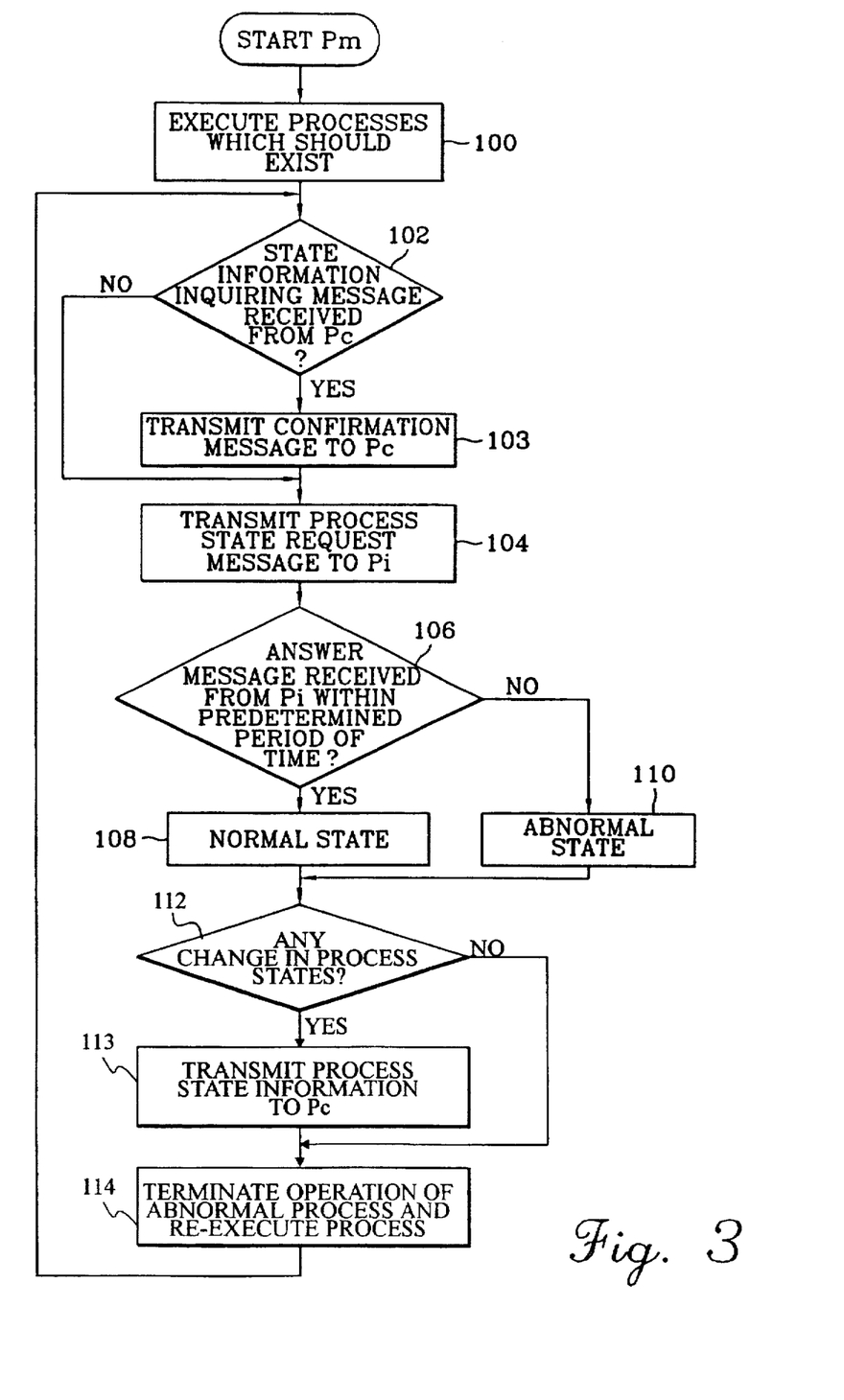
FIG. 3 is a flow chart of steps executed according to a control process Pm of the present invention.
Figure 5:
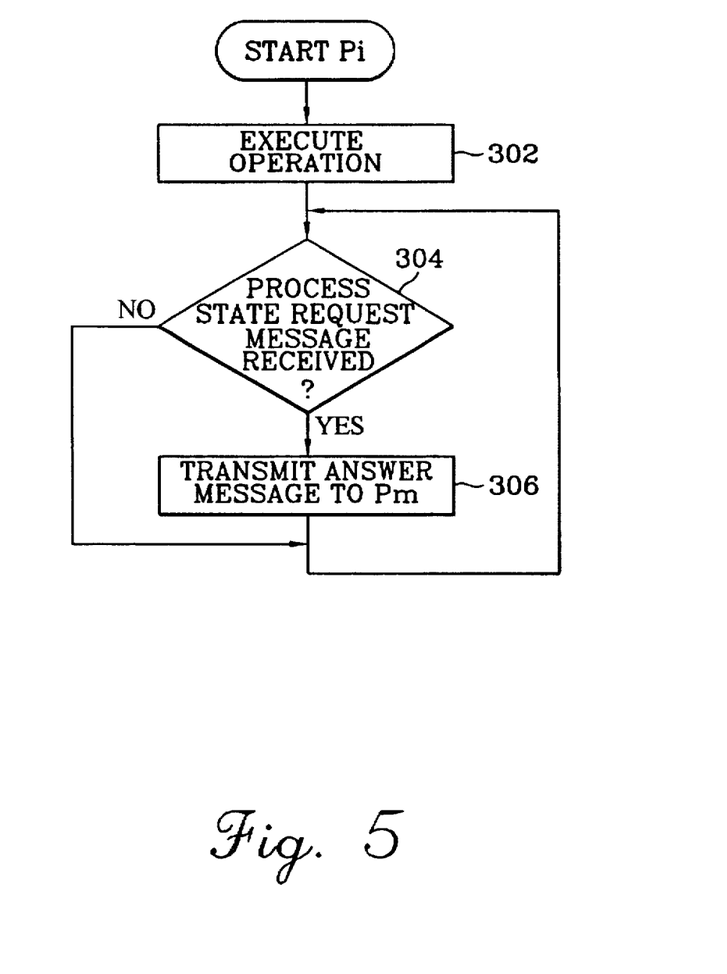
FIG. 5 is a flow chart of steps executed according to a general process Pi of the present invention.
Figure 6A:
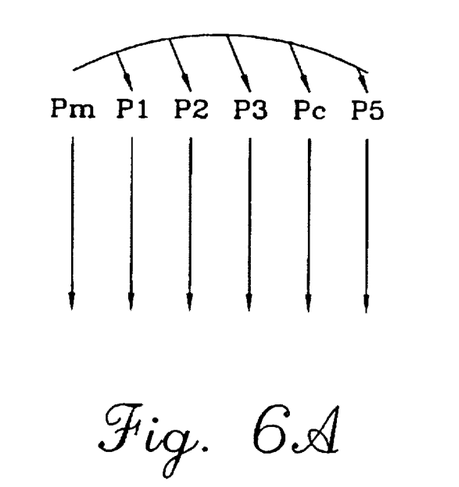
FIGS. 6A to 6D are illustrations showing protocol observed according to the present invention.
Figure 7A:
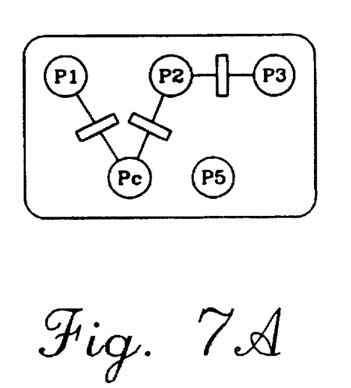
FIGS. 7A to 7D are illustrations showing images displayed according to the display process Pc of the present invention.

The control process Pm executes the processes which should exist, in step 100 of FIG. 3. FIG. 6A shows the protocol of this execution. The display process Pc executes a display of the initial state of the general processes Pi, in step 202 of FIG. 4. The display of the initial state executed by the display process Pc is shown in FIG. 7A. Each general process Pi executes a respective operation under the control of the control process Pm in step 302 of FIG. 5.

Figure 4:
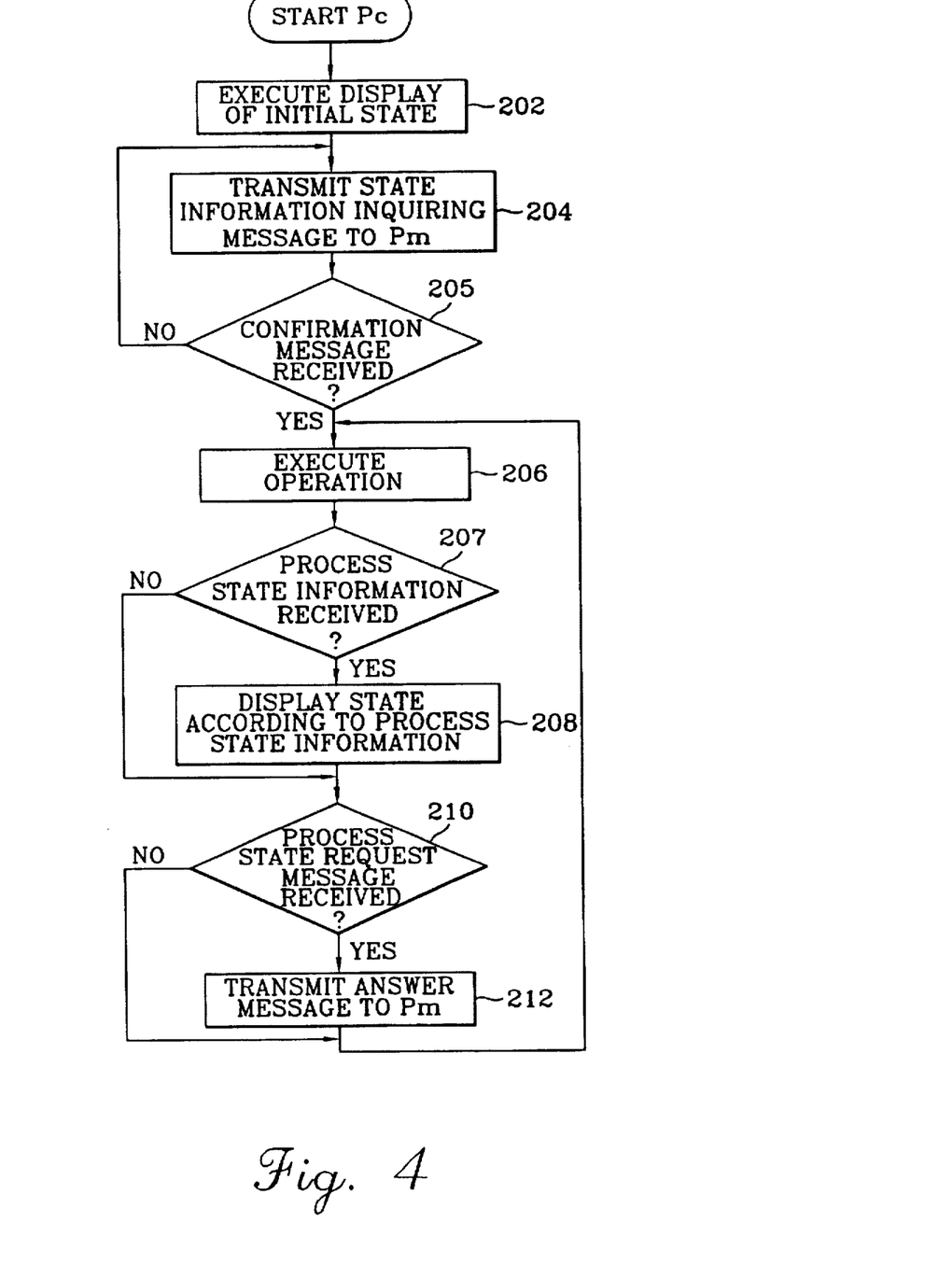
FIG. 4 is a flow chart of steps executed according to a display process Pc of the present invention.
Figure 6B:
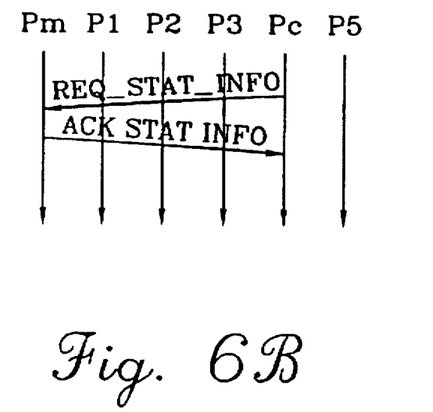

The display process Pc transmits a state information inquiring message to the control process Pm in step 204 of FIG. 4. The control process Pm detects receipt of the state information inquiring message in step 102 of FIG. 3, and transmits a confirmation message to the display process Pc in step 103 to indicate reception of the state information inquiring message. When the confirmation message is received in step 205 of FIG. 4, the display process Pc proceeds to step 206 and executes a corresponding operation. Otherwise, the display process Pc returns back to step 204, and the state information inquiring message is again transmitted to the control process Pm. FIG. 6B shows the protocol of this procedure.

Figure 6C:
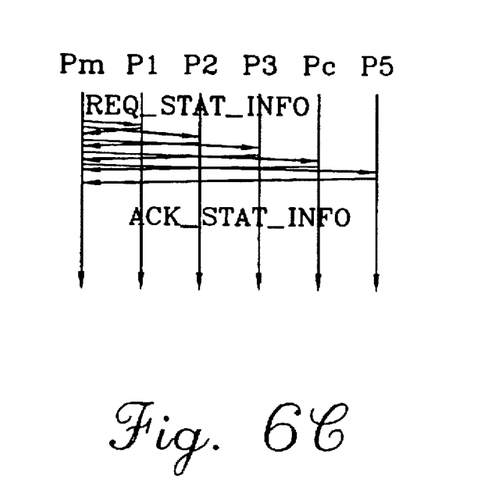

After performing step 103, the control process Pm transmits a process state request message to the general processes Pi in step 104. FIG. 6C shows the protocol of this operation. Receipt of the process state request message is detected in step 304 of FIG. 5 by only those general processes Pi which are executing normal operations. In response to receiving the process state request message, the general processes Pi each transmit an answer message (e.g. "Alive" state) to the control process Pm in step 306.

In step 106 of FIG. 3, the control process Pm determines whether or not the answer messages are received from respective general processes Pi within a predetermined period of time. When the answer message is received from a given general process Pi within the predetermined period of time, that general process Pi is determined to be in a normal state, in step 108. Alternatively, when the answer message is not received from a given general process Pi within the predetermined period of time, that general process Pi is determined to be in an abnormal (i.e., error) state, in step 110.

Figure 6D:
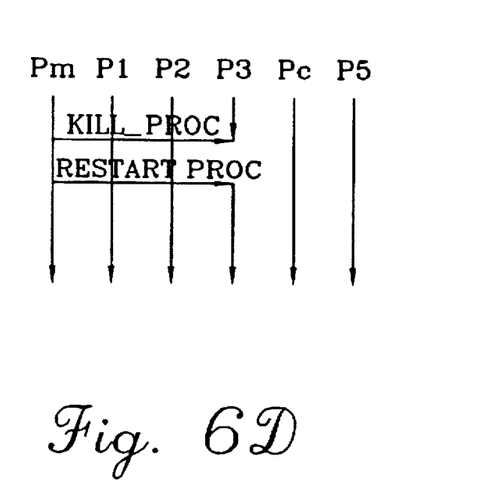

Next, in step 112, the control process Pm determines whether or not there is any change in the states of the general processes Pi. For each general process Pi having a change in state, the control process Pm transmits process state information (e.g., "Alive" to indicate a normal state, and "Dead" to indicate an abnormal state) to the display process Pc, in step 113. Then, in step 114, the control process Pm forcibly terminates the operation of each general process Pi in the abnormal state, and re-executes the process. FIG. 6D shows the protocol of this operation (with general process P3 exemplifying the process in the abnormal state). After performing step 114, the control process Pm proceeds back to step 102, and repeats operation.

In step 207 of FIG. 4, display process Pc detects receipt of the process state information transmitted by the control process Pm in step 113 of FIG. 3. The display process Pc responds by enabling graphic display 12 to display a control state according to the received process state information, in step 208. The control state is indicated by colors classified according to the state of each general process Pi. The graphic display 12 classifies relevant processes into groups, so that detailed information regarding the state of each process within the group can be displayed by activating a button corresponding to the group of the process. Activating the corresponding button is carried out through the input device 14 (e.o., mouse) of FIG. 1. Next, in step 210, the display process Pc determines whether or not the process state request message is received. When the process state request message is received, the display process Pc transmits the answer message to the control process Pm in step 212.

Figure 7B:
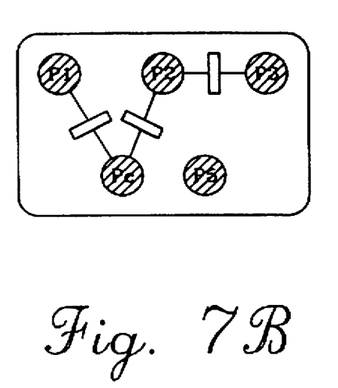
Figure 7C:
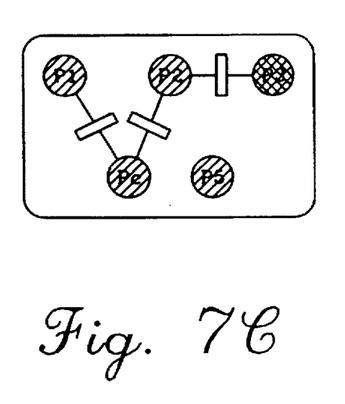
Figure 7D:
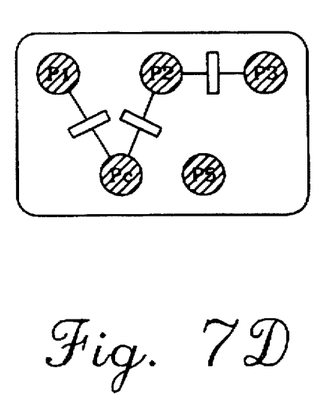

FIG. 7B shows a display indicating that all of the general processes Pi are in a normal state. FIG. 7C shows a display indicating that the general process P3 is in an abnormal state. FIG. 7D shows a display indicating that the general process P3 is restored to the normal state after being re-executed by the control process Pm.

As described above, the present invention enables an operator to conveniently recognize an abnormal state of a process by providing a visual representation of the process'state. When a given process is in an abnormal state, that process is automatically terminated and re-executed. This serves to minimize the loss caused when a process is terminated when the operator is absent from the computer system.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiments disclosed as the best mode contemplated for carrying out the present invention, but that the present invention includes all embodiments falling within the scope of the appended claims.

What is claimed is:

1. A process control method for a multiprocessing computer system, comprising the steps of:

executing a display process to display an initial state of general processes on a display terminal of the multiprocessing computer system, and then executing the general processes under a control of a control process;

transmitting a state information inquiring message to the control process by the display process;

transmitting a process state request message to the general processes by the control process, so that only the general processes that are operating normally receive the process state request message;

transmitting an answer message to the control process by each of the general processes that are operating normally, and then determining whether or not the answer message is received by the control process within a predetermined period of time;

determining a corresponding one of the general processes to be in a normal state when the control process receives the answer message from the corresponding general process within the predetermined period of time, and determining the corresponding general process to be in an abnormal state when the control process does not receive the answer message from the corresponding general process within the predetermined period of time;

transmitting state information representative of the states of the general processes to the display process by the control process; and displaying, via the display terminal, a control state according to the state information by the display process.

2. The process control method according to claim 1, further comprised of automatically terminating and then re-executing the general processes determined to be in the abnormal state.

3. The process control method according to claim 2, further comprised of the display terminal representing the initial state of the general processes using a first visual format.

4. The process control method according to claim 3, further comprised of the display terminal representing the normal state of the general processes using a second visual format.

5. The process control method according to claim 4, wherein the second visual format comprises a plurality of slanted lines.

6. The process control method according to claim 4, further comprised of the display terminal representing the abnormal state of the general processes using a third visual format.

7. The process control method according to claim 6, wherein the third visual format comprises a plurality of criss-crossed lines.

8. The process control method according to claim 1, further comprised of the display terminal representing the initial state of the general processes using a first visual format.

9. The process control method according to claim 8, further comprised of the display terminal representing the normal state of the general processes using a second visual format.

10. The process control method according to claim 9, wherein the second visual format comprises a plurality of slanted lines.

11. The process control method according to claim 9, further comprised of the display terminal representing the abnormal state of the general processes using a third visual format.

12. The process control method according to claim 11, wherein the third visual format comprises a plurality of criss-crossed lines.

13. A process control method for a multiprocessing computer system, comprising the steps of:

executing a display process to display an initial state of general processes on a display terminal of the multiprocessing computer system, and then executing the general processes under a control of a control process;

transmitting a state information inquiring message to the control process by the display process;

transmitting a confirmation message indicating reception of the state information inquiring message to the display process by the control process when the control process receives the state information inquiring message;

transmitting a process state request message to the general processes by the control process, so that only the general processes that are operating normally receive the process state request message;

transmitting an answer message to the control process by each of the general processes that are operating normally, and then determining whether or not the answer message is received by the control process within a predetermined period of time;

determining a corresponding one of the general processes to be in a normal state when the control process receives the answer message from the corresponding general process within the predetermined period of time, and determining the corresponding general process to be in an abnormal state when the control process does not receive the answer message from the corresponding general process within the predetermined period of time;

transmitting state information representative of the states of the general processes to the display process by the control process;

automatically terminating and then re-executing the general processes determined to be in the abnormal state; and displaying, via the display terminal, a control state according to the state information by the display process.

14. The process control method according to claim 13, further comprised of the display terminal representing the initial state of the general processes using a first visual format.

15. The process control method according to claim 14, further comprised of the display terminal representing the normal state of the general processes using a second visual format.

16. The process control method according to claim 15, further comprised of the display terminal representing the abnormal state of the general processes using a third visual format.

17. The process control method according to claim 16, wherein the third visual format comprises a plurality of criss-crossed lines.

18. The process control method according to claim 15, wherein the second visual format comprises a plurality of slanted lines.

19. A process control method for a multiprocessing computer system, comprising the steps of:

executing a display process to display an initial state of general processes on a display terminal of the multiprocessing computer system, and then executing the general processes under a control of a control process;

transmitting a process state request message to the general processes by the control process, so that only the general processes that are operating normally receive the process state request message;

transmitting an answer message to the control process by each of the general processes that are operating normally, and then determining whether or not the answer message is received by the control process within a predetermined period of time;

determining a corresponding one of the general processes to be in a normal state when the control process receives the answer message from the corresponding general process within the predetermined period of time, and determining the corresponding general process to be in an abnormal state when the control process does not receive the answer message from the corresponding general process within the predetermined period of time;

transmitting state information representative of the states of the general processes to the display process by the control process; and displaying, via the display terminal, a control state according to the state information by the display process.

20. The process control method according to claim 19, further comprised of automatically terminating and then re-executing the general processes determined to be in the abnormal state.

* * * * *